INVENTOR
JOSEPH A. JOHNSON

BY *Howell & Howell*

ATTORNEY

Oct. 12, 1971 J. A. JOHNSON 3,611,504
NOZZLE SYSTEM AND INJECTION NOZZLE FOR INJECTION
BLOW MOLDING AND INJECTION MOLDING MACHINES
Filed Oct. 23, 1969 2 Sheets-Sheet 2
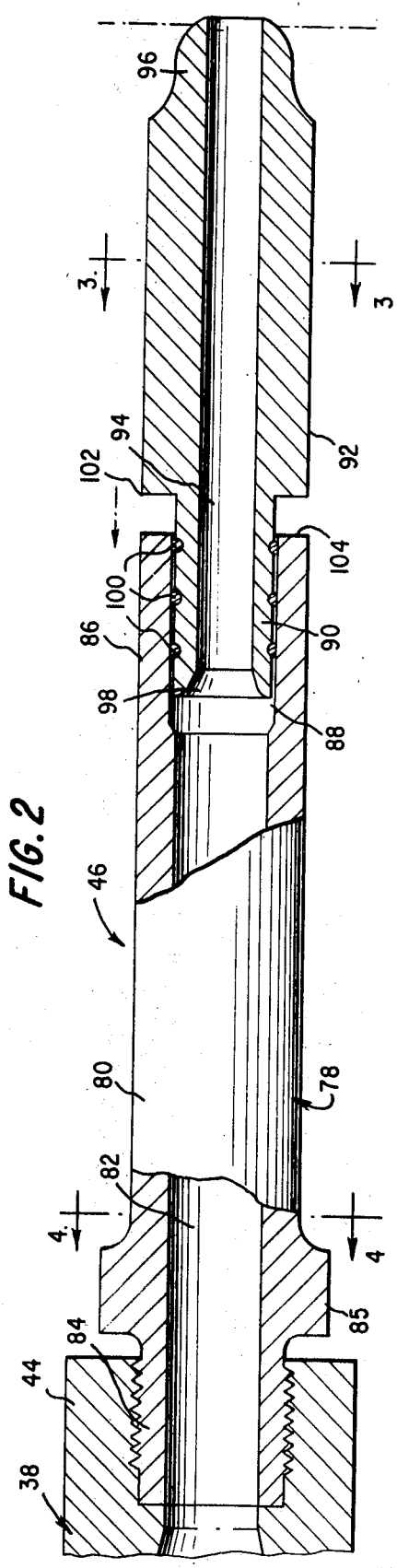
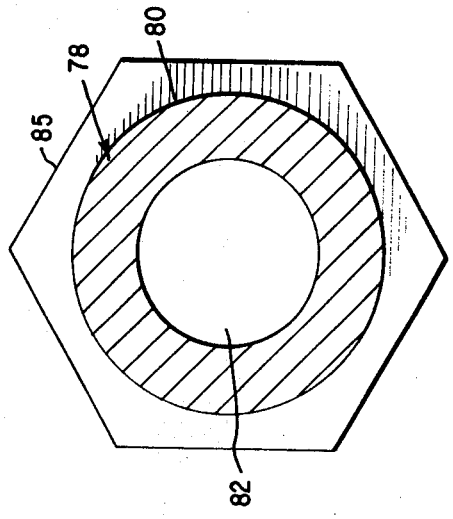
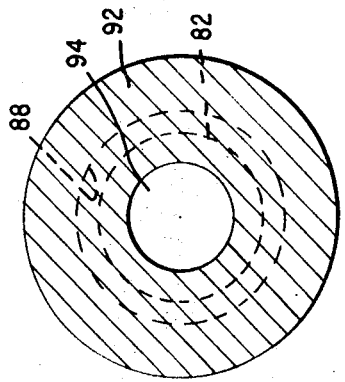
INVENTOR
JOSEPH A. JOHNSON
BY *Stowell & Stowell*
ATTORNEY

United States Patent Office 3,611,504
Patented Oct. 12, 1971

3,611,504
NOZZLE SYSTEM AND INJECTION NOZZLE FOR INJECTION BLOW MOLDING AND INJECTION MOLDING MACHINES
Joseph A. Johnson, Brigantine, N.J., assignor to Jomar Industries, Inc., Brigantine, N.J.
Filed Oct. 23, 1969, Ser. No. 868,766
Int. Cl. B29f 1/03
U.S. Cl. 18—30 CR
9 Claims

ABSTRACT OF THE DISCLOSURE

An extruder screw mechanism for injecting plastic melt into a mold cavity is mounted for bodily movement relative to the mold and has a telescopic injection nozzle unit that is extended by the plastic material pressure in the mold cavity with which the tip of the nozzle unit is in sealing engagement so as to cause the screw mechanism to move back away from the mold against the holding pressure of a hydraulic cylinder. The movement of the mechanism actuates a limit switch that controls a solenoid valve to stop the screw and reverse its rotation for a timed interval, decompressing the plastic melt in the nozzle unit to prevent plastic melt drool when the cavity opens, and allowing the nozzle unit to return to its original shortened position.

BACKGROUND OF THE INVENTION

(1) Field of the invention

This invention generally appertains to new and novel improvements in a nozzle system and injection nozzles for injection molding and injection blow molding machines and more particularly relates to a new and novel means for the prevention of overfilling and overpressurization of a mold cavity by an injection molding apparatus and a novel method of accurately controlling the pressure of plastic melt injected by an extruder screw mechanism into a mold cavity.

(2) Description of the prior art

In the operation of injection and/or injection blow molding machines, it is customary to use a feed screw, which is operatively mounted within a heating cylinder, for the moving of plastic material to one end of the screw assembly where there is a discharge nozzle that conveys the plastic melt into the cavity of a mold. When the predetermined amount of the plastic material has been accumulated at the nozzle end of the screw assembly, the material is forced through the nozzle into the mold cavity by moving the screw through the heating cylinder under the actuation of hydraulic motor.

In any such machine, the danger always exists of overfilling and overpressurizing the mold cavity which causes the plastic material to spew or ooze out from the mold cavity and the tip of the nozzle resulting in defects in the molded articles and also hindering subsequent molding operations as a result of the plastic material becoming cool and hardened around the tip of the nozzle.

The prior art has been aware of this problem and has attempted to obviate the same by providing a valve arrangement for the discharge nozzle. One of the best exemplary disclosures of this manner of solving the problem is disclosed in the patent to Goodwin, No. 2,668,325 issued Feb. 9, 1954. In such patent, the nozzle has a valve that is carried by a plunger which is spring urged in the closed position. Pressure of the overfilling plastic material in the mold cavity urges the plunger upwardly in the nozzle and the head of the plunger contacts and actuates limit switches that effect, through suitable circuitry, stoppage and reverse rotation of the feed screw. When the feed screw is reversed, a loss of pressure takes place in the nozzle so as to permit the spring to act on the plunger and close the valve in its nozzle seat, whereby the flow of plastic material from the tip of the nozzle is shut off.

SUMMARY OF THE INVENTION

It is a primary object of the present invention to prevent overfilling and overpressurization of a mold cavity by an injection molding apparatus by means of an internally unobstructed and simple nozzle structure that is formed to function as an actuating means for moving the entire plastifier unit away from the mold into operating engagement with a control means for the feed screw.

Generally stated, the present invention provides a screw and heating cylinder plastifier unit that is slidably mounted on a base which fixedly supports a mold having a cavity provided with a mouth that is formed to sealingly receive the tip of a nozzle unit for the plastifier unit. A hydraulic holding cylinder acts on the plastifier unit to seat the nozzle tip in the mouth of the mold cavity. Under actuation of a hydraulic motor drive the feed screw is rotated within the heating cylinder to inject plastic material through the nozzle unit into the mold cavity. The nozzle unit is composed of an inject nozzle body defined by a cylindrically shaped steel bar having a bore formed axially therethrough for passage of plastic material from an output end of the heating cylinder to which one end of the bar is attached by a threaded cap. The other end of the inject nozzle body has a precision axial bore for the telescopingly sliding fit of an inject nozzle tip. The inject nozzle tip has a smaller axial bore than the inject nozzle body and the plastic melt in the nozzle passage acts upon the differential area of the nozzle body and the nozzle tip to force the two components axially apart. The force of the plastic melt, causing the two parts of the nozzle unit to separate, is resisted by the controlled hydraulic pressure in the holding cylinder, thus controlling the pressure of the plastic melt in the mold cavity.

The inject nozzle tip has a spherical radius at its output end which forms a seal with a spheroidal seat or mouth in the mold cavity. The nozzle tip is formed in the surface, which forms a sliding bearing with the nozzle body, with a plurality of axially spaced apart annular grooves that collect plastic melt which leaks from this connection so as to provide an additional lubricant for the sliding fit between the nozzle body and the nozzle tip and which also clean the plastic material from the inner surface of the nozzle body.

When the pressure of the plastic material in the mold cavity, acting on the differential area of the two piece, telescopic nozzle unit, exceeds the pressure of the holding cylinder, that is controlled by a hydraulic pressure reducing valve, the entire plastifier unit slides on the base away from the mold so as to permit the nozzle unit to extend. When the plastifier unit moves away from the mold, it actuates an electrical limit switch that through a solenoid valve stops the feed screw and reverses the rotation thereof for a timed interval, decompressing the plastic melt in the nozzle unit, thus preventing plastic melt drool when the mold cavity opens and allowing the nozzle unit to return to its original shortened position.

The plastic melt pressure can be varied by the adjustment of the pressure reducing valve having a display gauge which is calibrated in pounds per square inch of plastic melt pressure.

From the foregoing general explanation of the invention it can be appreciated that an important object of the present invention is to provide a simple but highly reliable and most efficient mechanical arrangement for preventing overfilling and overpressurization of a mold cavity by an injection molding apparatus and, commensurate therewith, to provide a novel method of accurately controlling the pressure of plastic melt injected by an extruder screw mechanism into a mold cavity.

BRIEF DESCRIPTION OF THE DRAWINGS

FIG. 2 is an enlarged longitudial sectional view of the nozzle assembly as taken substantially on line 2—2 of FIG. 1, FIG. 3 is a transverse sectional view taken substantially on line 3—3 of FIG. 2.

FIG. 4 is a transverse sectional view taken substantially on line 4—4 of FIG. 2.

DESCRIPTION OF THE PREFERRED EMBODIMENT

Figure 1:
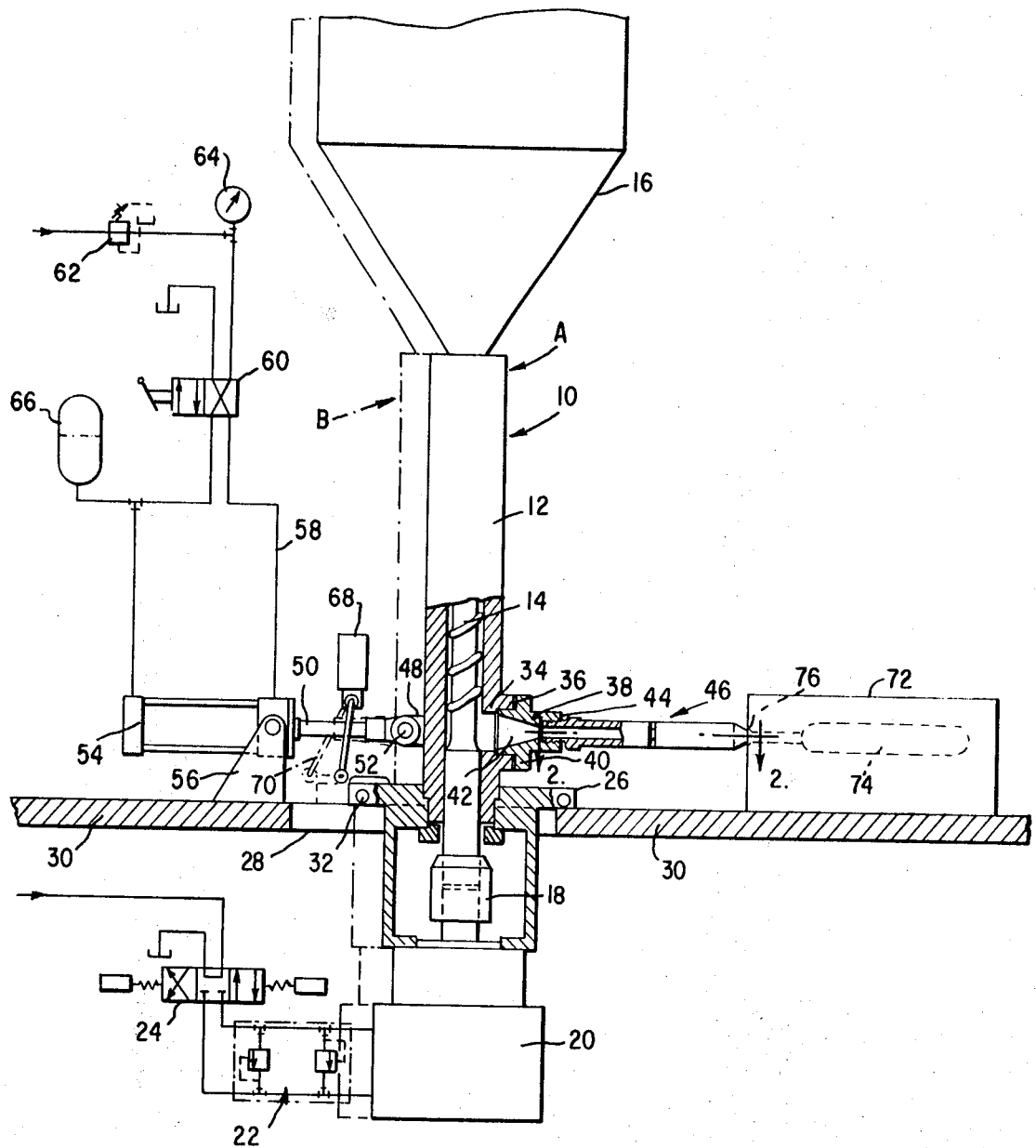
FIG. 1 is a side elevation, in a somewhat diagrammatic manner, of an injection molding machine embodying the present invention.

Referring now more particularly to the accompanying drawings and initially to FIG. 1 for an understanding of the overall injection molding machine or apparatus, generally designated by the numeral 10, it can be seen that the same includes a vertically disposed heating cylinder 12 within which a feed screw or worm 14 is operatively housed. A material hopper 16 is in communication with the upper end of the cylinder 12 and material from the hopper is conveyed down through the heating cylinder 12 by the feed screw 14 which is actuated through a drive coupling 18 by a hydraulic drive motor unit 20. The hydraulic drive motor unit 20 is provided with a hydraulic control circuit including dual relief valves 22 and a solenoid operated 4-way valve 24.

The lower end of the heating cylinder 12 is supported by a carriage 26 within which the drive coupling 18 is housed with the depending screw end portion within the carriage being in sealed relation with the lower end of the cylinder. The carriage 26 is supported in an opening 28 in a fixed base 30 and is movably mounted on the base by rollers 32 so that the entire plastifier unit, essentially composed of the heating cylinder 12 and the feed screw 14, can move from the full line position A of FIG. 1 to the phantom line position B of FIG. 1.

The heating cylinder 12 is provided above the carriage 26 with a radial outlet 34 that has an external encircling shoulder 36. A cap 38 is sealingly fitted in the outlet 34 and has a mounting flange 40 that is fixed to the shoulder 36. The cap 38 has a frusto-conical bore 42 with the major end thereof being a diameter substantially equal to the diameter of the outlet 34 with which it is in adjoining communication. The minor end of the bore 42 communicates with an internally threaded collar 44 of the cap and the collar supports a telecopic nozzle unit or assembly 46 which will be more particularly described in regards to FIGS. 2-4.

The heating cylinder 12, on its side point diametrically opposite to the nozzle unit 46, is provided with a mounting ear arrangement 48 to which the outer end of a piston rod 50 is attached by a pivot pin 52 with the piston rod being in axial alignment with the nozzle unit 46. The piston rod 50 is operatively carried by a hydraulic holding cylinder 54 that is fixedly supported in a horizontal position above the base 30 by a supporting bracket 56 which upstands from the base.

The hydraulic holding cylinder 54 has a hydraulic control circuit 58 that includes a manual 4-way valve 60, a pressure reducing valve 62 with a gauge 64 and an accumulator 66.

An electrical limit switch 68 is provided and has a swinging contact arm 70 that is vertically oriented in the path of the rearward movement of the carriage 26 so as to be struck by the carriage. The limit switch 68 controls the 4-way solenoid valve 24.

The base 30 supports in any suitable fixedly located manner a mold 72 that has a cavity 74 which is provided with a spherical entrance mouth 76 that defines a seat for the outer end of the tip of the nozzle unit 46, as will be described.

With reference more particularly to FIGS. 2–4, the nozzle unit 46 includes an inject nozzle body 78 that is a cylindrical shaped steel bar 80 having a longitudinal tubular bore 82 formed therethrough for the passage of the plastic material. The nozzle body has an externally threaded inner end 84 which is screwed into the collar 44 on the cylinder cap 38 so that the bore 82 is in perfect axial alignment and communication with the minor end of the bore 42 of the cap 38. For the purpose of enabling the end 84 of the nozzle body to be screwed into the collar 44 the bar 80 is formed adjacent the end 84 with a multifaced shoulder 85 that can be engaged by a wrench or similar tool. The bore 82 at the end 84 is of substantially the same diameter as the minor end of the cap bore 42.

The nozzle body 78 at its outer end portion 86 has a smooth counterbore 88 which is of slightly larger diameter than the bore 82 and which defines a precision bore for slidably receiving a tubular, coaxially reduced inner end portion 90 of a nozzle tip 92, such inner end portion 90 constituting a sliding extension of the nozzle tip and cooperating with the bore 88 to provide the telescopic interfit between the nozzle body 78 and the nozzle tip 92.

The nozzle tip 92 has an axial bore 94 that is of a smaller diameter than the bore 82 in the nozle body 78. The bore 94 is of a constant diameter from the outer reduced spherical end 96 of the nozzle tip to a point spaced slightly inwardly from the end of the coaxially reduced sliding extension end portion 90. At such point, the bore 94 is flared outwardly to provide a bell end 98 on the end portion 90 with the outwardly flared bell end 98 providing a smooth merging transition portion from the diameter of the bore 82 in the nozzle body 78 to the smaller diameter of the bore 94 in the nozzle tip 92 and also serving as a differential impact area between the nozzle body 78 and the companion telescopic nozzle tip 92.

The plastic melt in the nozzle passage or bore 82 acts upon the differential area 98 between the nozzle body and the nozzle tip to force the two parts apart. The force of the plastic melt, which causes the two parts of the nozzle unit to separate, is resisted by the controlled hydraulic pressure in the hydraulic holding cylinder 54, thus controlling the pressure of the plastic melt in the mold cavity 74.

The inject nozzle tip 92 has a spherical radius at its output end 96 which forms a seal with the spherical seat 76 of the mold cavity 74. The nozzle tip 92 has a number, for example three, of longitudinally spaced annular grooves 100 formed in the exterior surface of the sliding extension 90 that forms the sliding bearing with the nozzle body 78. The grooves 100 collect plastic melt which leaks from this sliding connection forming an additional lubricant for the sliding fit and also cleaning the plastic material from the inner surface of the nozzle body. The nozzle body and the nozzle tip are of substantially the same outer diameter and at the inner end of the sliding extension 90 the nozzle tip has a shoulder 102 which is adapted to abut against the flat outer end 104 of the nozzle body in the original or shortened position of the telescopically arranged nozzle parts.

In operation, the manual 4-way valve 60 is actuated to cause the holding cylinder 54 to seat the spherical end 96 of the nozzle tip 92 in the seat 76 of the mold cavity 74 with the nozzle parts being in their normal shortened relation. The solenoid 4-way valve 24 is then energized to cause the hydraulic motor drive 20 to rotate the feed screw 14 so as to inject plastic material into the mold cavity.

When plastic material pressure in the mold cavity, acting on the differential area 98 of nozzle unit 46, exceeds the pressure of the holding cylinder 54, controlled by the hydraulic pressure reducing valve 62, the entire plastifier unit rolls back on the cylinder carriage 26, allowing the two piece nozzle unit 46 to extend. As the plastifier unit moves back, the carriage strikes the arm 70 of the limit switch 68 to actuate the limit switch that controls the 4-way solenoid valve 24 so as to stop the rotation of the feed screw 14 and reverse the rotation thereof for a timed interval. This decompresses the plastic melt in the nozzle unit or assembly 46, thus preventing plastic melt drool when the mold cavity opens and allowing the nozzle unit to return to its original shortened position.

The plastic melt pressure can be varied by adjustment of the pressure reducing valve 62 with the values displayed on the gauge 64 that is calibrated in pounds per square inch of melt pressure.

It can thus be seen that a simple but most dependable and very sturdy means is provided for preventing overfilling and overpressurization of the mold cavity with the plastifier unit being mounted for bodily movement to actuate a limit switch that controls the operation of the feed screw of the plastifier unit and the plastifier unit being urged rearwardly away from the mold cavity and into contact with the limit switch by the telescopic nozzle unit or assembly in its reaction to the plastic material pressure in the mold cavity against the pressure of the holding cylinder which is controlled by the adjustable pressure reducing valve.

I claim:

1. A molding machine comprising an extruder mechanism including an injection nozzle and nozzle tip for injecting plastic melt into a fixedly located mold cavity, means mounting the extruder mechanism for bodily movement toward and away from the fixedly located mold cavity, a hydraulic holding cylinder for holding the extruder mechanism against movement away from the mold cavity, means for controlling the operation of the extruder mechanism, said controlling means being disposed in the path of movement of the extruder mechanism away from the mold cavity, and means responsive to plastic melt pressure in the mold cavity in opposition to the holding pressure of the holding cylinder for moving the extruder mechanism except the nozzle tip away from the mold cavity and causing it to engage and actuate the controlling means whereby further injection of the plastic melt into the mold cavity is discontinued.

2. A molding machine comprising an extruder mechanism for injecting plastic melt into a fixedly located mold cavity, means mounting the extruder mechanism for bodily movement toward and away from the fixedly located mold cavity, a hydraulic holding cylinder for holding the extruder mechanism against movement away from the mold cavity, means for controlling the operation of the extruder mechanism, said controlling means being disposed in the path of movement of the extruder mechanism away from the mold cavity, and means responsive to plastic melt pressure in the mold cavity in opposition to the holding pressure of the holding cylinder for moving the extruder mechanism away from the mold cavity and causing it to engage and actuate the controlling means whereby further injection of the plastic melt into the mold cavity is discontinued, said last named means includes a telescopic nozzle unit communicatingly connecting the extruder mechanism with the mold cavity for the passage of the plastic melt from the extruder mechanism into the mold cavity.

3. The invention of claim 2 wherein said telescopic nozzle unit includes a nozzle body fixedly carried by the extruder mechanism and a nozzle tip, said nozzle body and said nozzle tip having telescopically arranged adjoining ends and a differential area at said ends upon which the plastic melt passing within the nozzle unit acts to cause the nozzle body and the nozzle tip to separate.

4. The invention of claim 3 wherein said nozzle tip terminates in outer output end having a spherical radius adapted to sealingly mate with an entrance mouth of the mold cavity.

5. The invention of claim 3 wherein said nozzle tip has a coaxially reduced inner end portion, said nozzle body having an outer end provided with a precision bore slidingly receiving the inner end portion and said inner end portion having an exterior surface formed with a series of longitudinally spaced annular grooves that are adapted to collect plastic melt leaking from such connection and forming a lubricant for the sliding bearing fit between the inner end portion and the bore.

6. The invention of claim 2 wherein a base is provided upon which the mold cavity is fixedly located, said extruder mechanism being supported by a carriage rollingly mounted on the base and constituting the mounting means for the extruder mechanism.

7. The invention of claim 2 wherein means is provided for adjusting the holding pressure of the holding cylinder so as to vary the plastic melt pressure operable to effect the movement of the extruder mechanism.

8. A molding machine comprising an extruder mechanism for injecting plastic melt into a fixedly located mold cavity, means mounting the extruder mechanism for bodily movement toward and away from the fixedly located mold cavity, a hydraulic holding cylinder for holding the extruder mechanism against movement away from the mold cavity, means for controlling the operation of the extruder mechanism, said controlling means being disposed in the path of movement of the extruder mechanism away from the mold cavity, and means responsive to plastic melt pressure in the mold cavity in opposition to the holding pressure of the holding cylinder for moving the extruder mechanism away from the mold cavity and causing it to engage and actuate the controlling means whereby further injection of the plastic melt into the mold cavity is discontinued, said controlling means includes a limit switch, said extruder mechanism including a heating cylinder and a screw rotatably mounted in the heating cylinder, a hydraulic motor drive for the screw and having a hydraulic circuit including a solenoid operated valve and said limit switch controlling the valve so as to control the rotary movements of the screw.

9. The invention of claim 2 wherein an adjustable pressure reducing valve with a setting gauge is provided for the holding cylinder so as to adjust the holding pressure of the holding cylinder and thereby vary the plastic melt pressure operable to effect the movement of the extruder mechanism.

References Cited

UNITED STATES PATENTS 3,146,287   8/1964   Kleine-Albers ____ 18—30SS X

J. SPENCER OVERHOLSER, Primary Examiner

N. E. LEHRER, Assistant Examiner

U.S. Cl. X.R.

18—2 HA, 30 NR